United States Patent [19]
Bonnett

[11] Patent Number: 5,642,563
[45] Date of Patent: Jul. 1, 1997

[54] SINGLE STATION ASSEMBLY APPARATUS FOR AUTOMOTIVE MULTI-PANEL COMPARTMENT

[75] Inventor: Roy E. Bonnett, Bloomfield, Mich.

[73] Assignee: Ford Motor Company, Dearborn, Mich.

[21] Appl. No.: 533,232

[22] Filed: Sep. 25, 1995

[51] Int. Cl.$^6$ ..................................................... B23P 21/00
[52] U.S. Cl. .......................... 29/771; 29/281.1; 29/281.5; 29/464; 29/897.2; 269/37
[58] Field of Search ............................ 29/281.1, 281.5, 29/464, 771, 784, 897.2; 269/41, 37, 43

[56] References Cited

U.S. PATENT DOCUMENTS

| | | |
|---|---|---|
| 4,603,462 | 8/1986 | Kondo .................................. 29/281.1 |
| 4,836,600 | 6/1989 | Miyazaki et al. . |
| 4,968,087 | 11/1990 | Goria . |
| 5,090,105 | 2/1992 | DeRees . |
| 5,191,707 | 3/1993 | Sasamoto et al. . |
| 5,199,156 | 4/1993 | Rossi . |
| 5,209,541 | 5/1993 | Janotik . |
| 5,213,386 | 5/1993 | Janotik et al. . |

FOREIGN PATENT DOCUMENTS

| | | | |
|---|---|---|---|
| 3-213222 | 9/1991 | Japan ................................. | 29/281.1 |
| 4-244329 | 9/1992 | Japan ................................. | 29/281.1 |
| 4-244330 | 9/1992 | Japan ................................. | 29/281.1 |

*Primary Examiner*—S. Thomas Hughes
*Attorney, Agent, or Firm*—David B. Kelley

[57] ABSTRACT

An assembly apparatus for assembling multiple panels at a single assembly site into an adhesively fixed, spaced relationship without direct contact therebetween mounts the panels with respect to a single base for movement into an assembled position. The apparatus has a base for receiving an underbody thereon, the base having a forward end, a rear end, and underbody alignment and retention means. A pedestal proximate the rear end of the base has a roof support member cantileverly mounted from a forward wall thereof in generally planar alignment with the base for receiving a roof inner panel on an upper surface thereof. A rotatable roof holder is axially mounted on an upper edge of the pedestal for receiving a roof outer panel thereon and for rotating the roof panel onto the roof inner panel. A pair of side supports are rotatably mounted on a pair of referencing rails on opposing side edges of the base for swingably positioning a pair of body side panels in juxtaposition with the underbody, the roof outer panel, and the roof inner panel. A slidable tray is mounted on the pair of referencing rails at the forward end of the base for holding a body front end portion to slidingly engage the body front end with the underbody and the pair of body side panels.

17 Claims, 11 Drawing Sheets

SINGLE STATION ASSEMBLY APPARATUS FOR AUTOMOTIVE MULTI-PANEL COMPARTMENT

FIELD OF THE INVENTION

The present invention relates generally to automotive compartment assembly apparatus, and, more particularly, to an apparatus for assembling a multi-panel compartment at a single assembly station.

BACKGROUND OF THE INVENTION

Traditionally, a vehicle body is built along an assembly line which may have various subassembly lines, each of which adds a component or module to the body, such as seen in U.S. Pat. No. 5,090,105 (DeRees). Prior assembly methods are prone to tolerance stack-up, which is the addition of successive tolerances as components are added. Tolerance stack-up leads to unacceptable mating of adjacent panels and potentially to compression and tension points in the vehicle body which may add to stress induced cracks or other deficiencies.

Vehicle panels made of composite materials are gaining more widespread use due to desirable characteristics, including broad design flexibility, part consolidation with low tooling cost, dimensional stability, low weight, high strength, corrosion resistance, and excellent thermal and sound properties. Such panels are typically clamped together with an adhesive therebetween. When the bond sets, the clamps are removed, thus introducing stress into the joint.

An assembly apparatus is thus needed which reduces tolerance stack-up while permitting discrete body panels to be presented for adhesive, non-clamping assembly relative to a single base.

SUMMARY OF THE INVENTION

The present invention provides an assembly apparatus for assembling multiple panels at a single assembly site into an adhesively fixed, spaced relationship without direct contact therebetween by mounting the panels with respect to a single base for movement into an assembled position. The apparatus has a base for receiving an underbody thereon, the base having a forward end, a rear end, and underbody alignment and retention means. A pedestal is situated proximate the rear end of the base with a roof support member cantileverly mounted from a forward wall thereof of the pedestal in generally planar alignment with the base for receiving a roof inner panel on an upper surface thereof. Axially mounted onto an upper edge of the pedestal is a rotatable roof holder for receiving a roof outer panel thereon and for rotating the roof panel onto the, roof inner panel. A pair of side supports are rotatably mounted on a pair of referencing rails on opposing side edges of the base for swingably positioning a pair of body side panels into juxtaposition with the underbody, the roof outer panel, and the roof inner panel. At the forward end of the base is a slidable tray mounted on the pair of referencing rails for holding a body front end portion to slidingly engage the body front end with the underbody and the pair of body side panels.

The underbody alignment and retention means preferably comprises a pair of alignment and retention cups on opposite sides of the forward end of the base and a pair of alignment and retention cups on opposite sides of the rear end of the base. The alignment and retention cups each have a raised cylindrical portion for vertical alignment of the underbody with respect to the base. At least, one of the cups has at least three circumferentially spaced alignment prongs on the cylindrical portion, and a seal member substantially surrounding the at least three alignment prongs. A lever mounted on a rear lateral area of the base positions the underbody laterally against an upwardly extending tab on the base. The underbody is thus aligned in three dimensions on the base by the alignment and retention cups, and by the lever and tab.

The roof support, the side supports, and the roof holder have alignment means thereon for providing a predetermined spaced relationship therebetween. The alignment means comprises at least one recess and knob combination on a peripheral portion of each of the side supports, the roof support, and the roof holder, with a knob of the combination on one of the side supports, the roof support, and the roof holder, and the recess of the recess and knob combination on an adjacent peripheral portion of another of the side supports, the roof support, and the roof holder.

An advantage of the present invention is a vehicle body assembly apparatus for assembling multiple panels at a single assembly site by mounting the panels with respect to a single base for movement into an assembled position.

Another advantage is an assembly apparatus for assembling multiple panels at a single assembly site into an adhesively fixed, spaced relationship without direct contact therebetween.

A feature of the present invention is a set of referencing rails which provide a reference for body panels to be positioned with respect to a single base.

Another feature is a roof support cantileverly mounted above the base of the assembly apparatus.

Still another feature is a rotatable roof tray for receiving and positioning an outer roof panel onto an inner roof panel.

Yet still another feature is a front tray slidable with respect to the single base for positioning a front end member relative mating body panels.

Another feature is an alignment and retention cup on a base of a single assembly apparatus having a cylindrical base, a three-pronged alignment member, and an annular seal member surrounding the cylindrical base.

BRIEF DESCRIPTION OF THE DRAWINGS

These and other objects, advantages and features of the present invention will be apparent to those skilled in the automotive body arts upon reading the following description with reference to the accompanying drawings, in which.

DETAILED DESCRIPTION OF THE PREFERRED EMBODIMENTS

Figure 1:
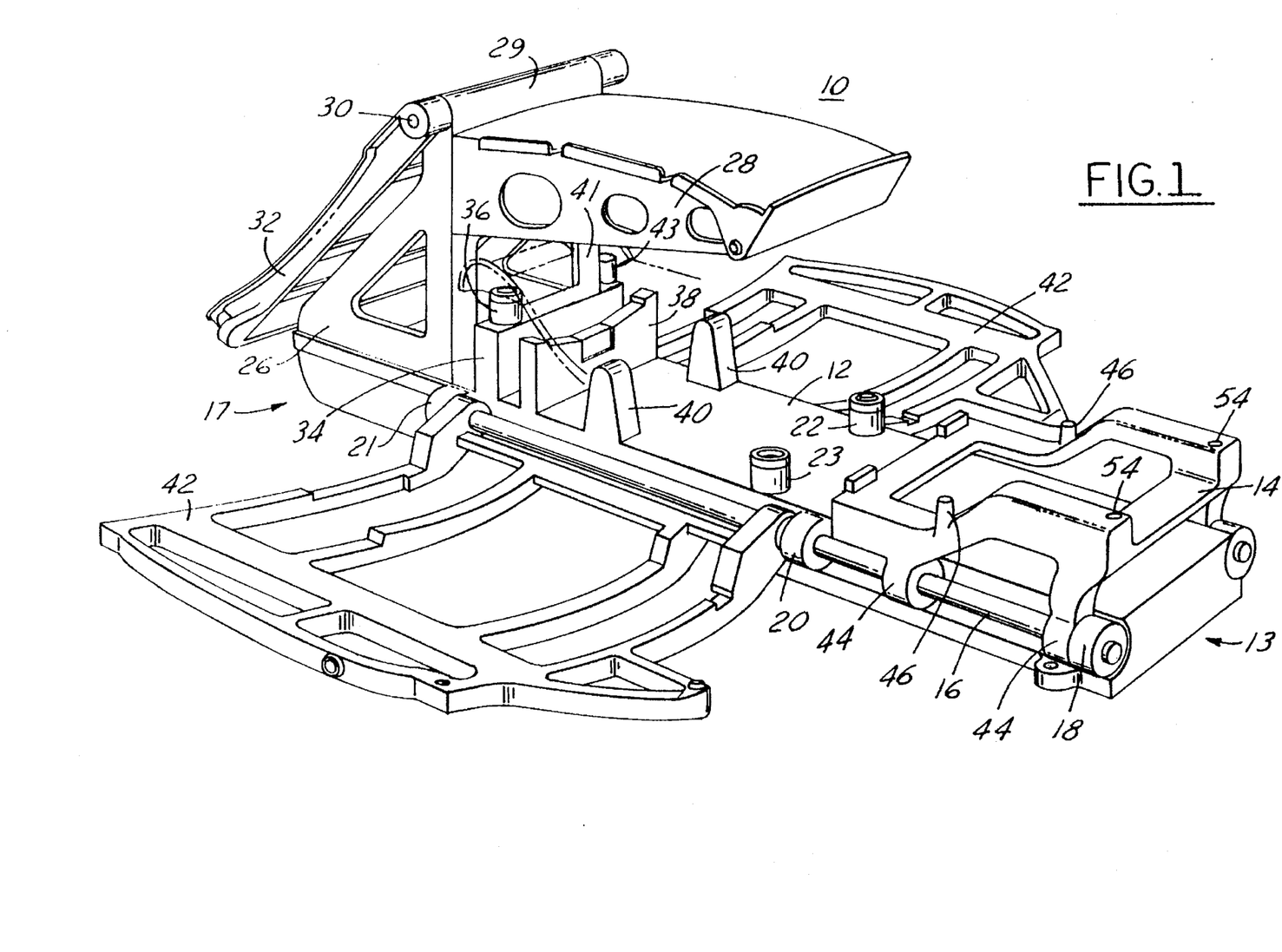
FIG. 1 is a perspective view of a multi-panel body assembly apparatus for assembling a vehicle compartment according to the present invention.
Figures 3A, 3B:
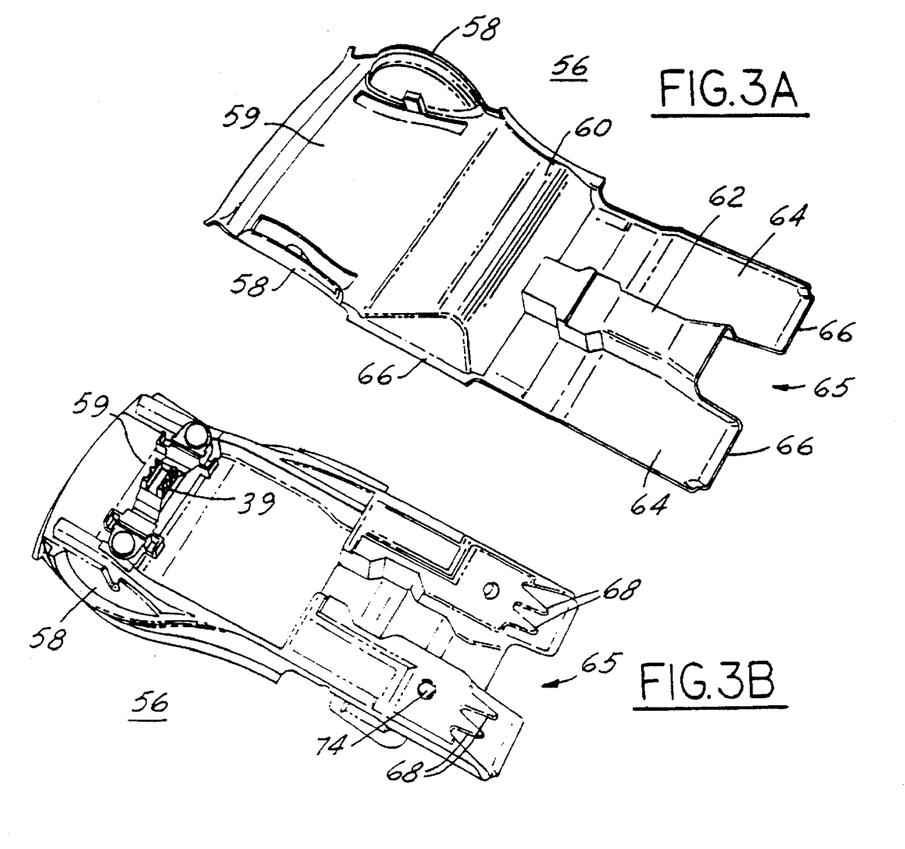
FIG. 3A is a perspective top view of a vehicle body compartment underbody.
FIG. 3B is a bottom view of the underbody shown in FIG. 3A.

Referring now to the drawings, and in particular to FIG. 1 thereof, a multi-panel compartment assembly station apparatus 10 is shown. The assembly station apparatus 10 has a base 12 onto which various panel mounting and aligning features are attached. Beginning with front of the assembly station apparatus 10, generally indicated at 13, which is at the right in FIG. 1, a front tray 14 is slidably disposed on a pair of longitudinally extending rails 16. The rails 16 extend from the front 13 of the base 12 to the rear thereof, generally indicated at 17, and are mounted in a front boss 18, a rear boss 21, and a center boss 20. Extending upwardly from a front lateral area of the base. 12 are a pair of underbody front alignment and retention cups 22, 23 described in more detail below. At the rear section of the base 12 is a support bracket 26 having triangular shaped sides with a shelf 28 cantileverly extending therefrom toward the front of the base 12. At the top 29 of the bracket 26 is an axle 30 running transversely with respect to the base 12 and upon which a rear tray 32 is rotatably mounted. Just forward of the bracket 26 is a wall 34 having a pair of underbody rear alignment and retention cups 36 thereon. Forward of the wall 34 is a pedestal 38 upon which a portion of the suspension 39 rests. The suspension 39 is best seen in FIG. 3B. Forward of the pedestal 38 are a pair of lateral posts 40, also for supporting the, suspension 39. A lever 41 mounted on a rear lateral area of the base 12 positions an underbody 56 (FIGS. 3A and 3B) laterally against an upwardly extending tab 43 on the base 12. Preferably, the lever is spring loaded, or alternatively, hydraulically or pnuematically operated. The underbody 56 is thus aligned in three dimensions on the base 12 by the alignment and retention cups 22, 23, and 36, and by the lever 41 and the tab 43.

Figure 2:
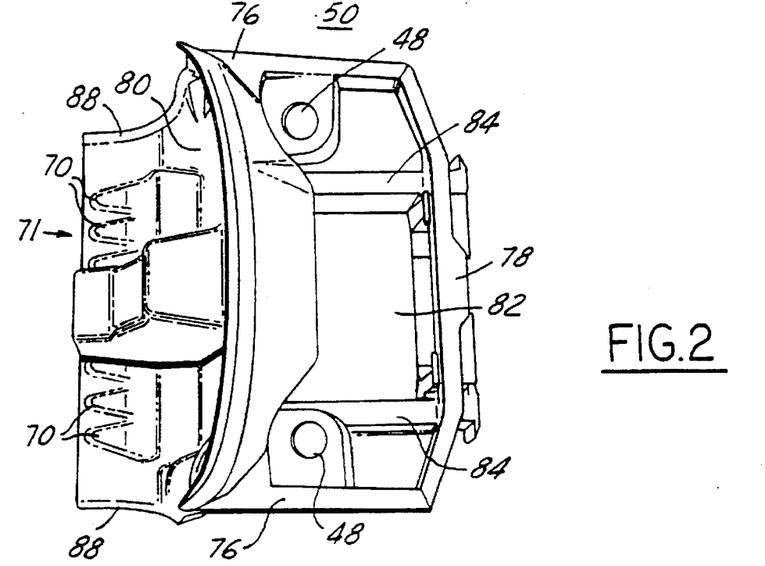
FIG. 2 is a top view of a vehicle front end which fits within a tray of the body assembly apparatus for attachment to the vehicle body compartment.

Still referring to FIG. 1, a pair of side supports 42 are mounted on opposite sides of the base 12 between the center boss 20 and rear boss 21 of the rail 16 for rotational movement around the longitudinal axis thereof. The front lo tray 14 is slidably mounted to the rails 16 on both sides, with a pair of front tray bosses 44 which slide between the center boss 20 and the front boss 18. The front tray 14 bas upwardly extending knobs 46 for engagement with suspension receiving openings 48 on opposite sides of a front member 50 (FIG. 2). The front tray 14 also has a pair of keys 52 at a rear portion thereof, and a pair of orifices 54 on a front portion thereof, for properly aligning the front member 50 on the front tray 14.

The front end member 50, as seen in FIG. 2, has a pair of sides 76, a radiator support 78, and a passenger compartment wall 80, collectively defining therebetween an engine compartment 82. A pair of support members 84 extend from the passenger compartment wall 80 to the radiator support 78 through the engine compartment 82 area. A transmission conduit 86 extends rearwardly from the passenger compartment wall 80, which, for purposes of FIG. 2, is to the left. The transmission conduit 86 mates with a flared section of the transmission and driveshaft duct 62 of the underbody 56 (FIGS. 2 and 3A). Flanges 88 along the lateral outer portion of the passenger compartment wall 80 mate with the flanges 66 of the underbody 56.

Turning now to FIG. 3A, the underbody 56 is seen having a pair of wheel wells 58 on opposite sides at a rear portion 59, a transverse section 60, a transmission and driveshaft duct 62, and a pair of foot platforms 64 on opposite sides at a forward section generally indicated at 65. Around the periphery of the underbody 56 is an upwardly turned flange 66 extending around essentially the entire periphery of the underbody 56. As discussed further below, the flange 66 mates with flanges on adjoining panels, including the side panels 104 and the front member 50 (FIG. 2).

On the bottom of the underbody 56, as seen in FIG. 3B, the foot platforms 64 have embossed, semi-sinusoidal teeth 68 for engagement with teeth receiving embossments 70 on an underside era rear section 71 of the front member 56, as seen in dotted line in FIG. 2. A recess 74 located on one of the foot platforms 64 engages with the alignment cup 22, as further described below with respect to FIG. 14.

Figure 4A:
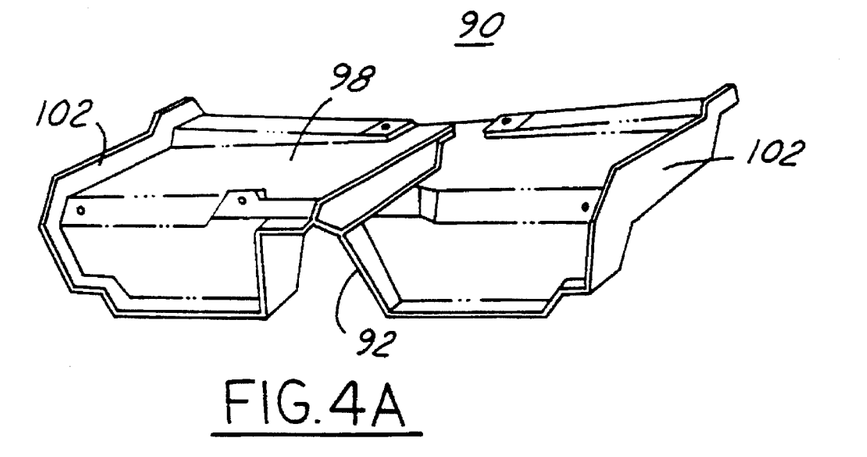
FIG. 4A is a perspective view of a side cross support member.
Figure 4B:
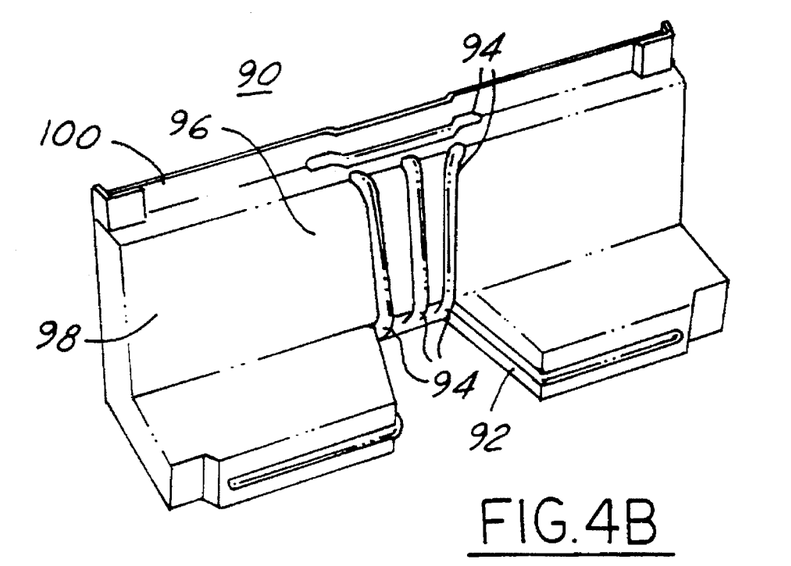
FIG. 4B is a bottom view of the support member of FIG. 4A, shown with adhesive attached thereto.

Referring now to FIGS. 4A and 4B, a body cross-support member 90 is shown which mounts over the transmission and driveshaft duct 62 via an arch 92. Adhesive 94 placed on a flange along the arch 92, and along a center section of a top panel 98 of the cross-support member 90, as well as on a rear under flange 100, attaches the cross-support member 90 to the underbody 56. A flange 102 along the outer periphery of the cross-support member 90 mates with the body side panels 104.

Figure 5:
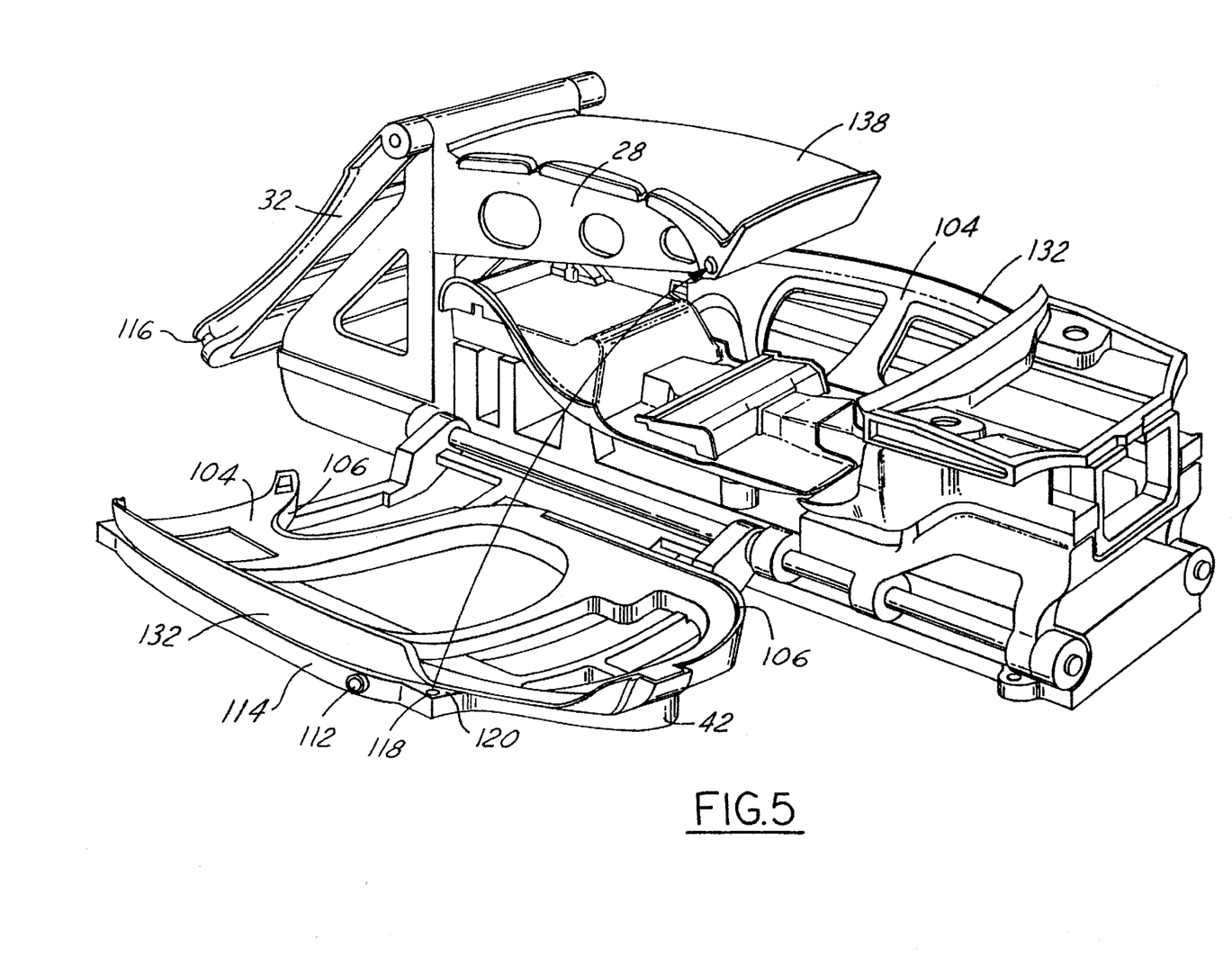
FIG. 5 is a view similar to FIG. 1, but showing the underbody, the roof inner pane. 1, the roof outer panel, the body side panels, and the front end member appropriately placed on the assembly station apparatus according to the present invention.
Figure 6:
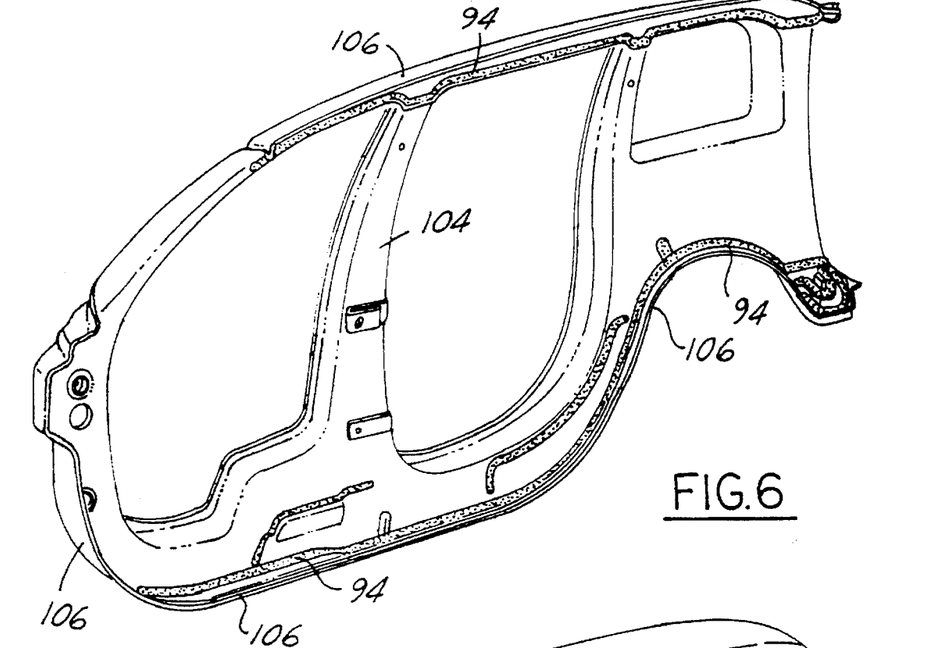
FIG. 6 is an inner view of a body side panel showing adhesive application locations thereon.

As seen in FIG. 5, a pair of body side panels 104 fit on the side supports 42 in a generally horizontal position prior to connection with other body components on the assembly apparatus 10. The body side panels have inwardly extending mating flanges 106 on the periphery thereof, which receive an adhesive 94 thereon, as best seen in FIG. 6. The side support 42 has a cup 112 on an upper edge 114 thereof for mating with a knob 116 in the rear tray 32. A recess 118 in a forward surface, 120 of the side support 116 mates with a knob 122 on the cantilevered shelf 28 for maintaining alignment during assembly.

Figure 7:
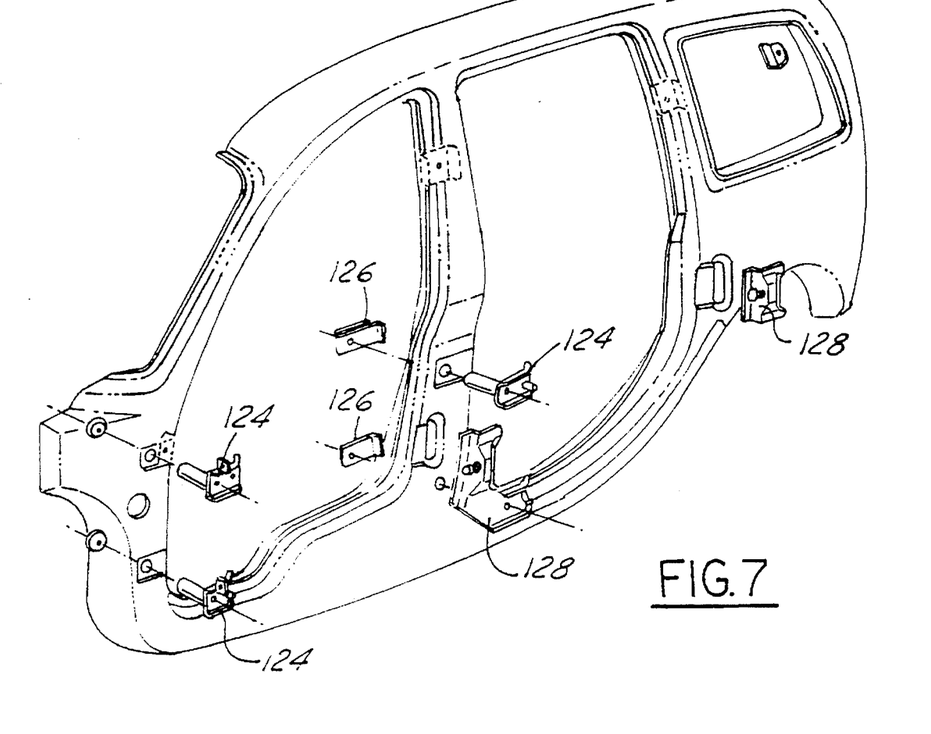
FIG. 7 is a side perspective view of a body side panel showing attachment of hardware thereto in exploded view.

Body hardware is placed onto the body side supports 42 by placement over pins (not shown) projecting from an inner surface thereof and can be held in place with magnets (not shown) on an outer surface of the body side supports 42. For example, the vehicle door hinges 124 would be placed on the body side supports 42, the body side panels 104 would be placed thereover, and the brackets 126 and striker plates 128 then would be attached at appropriate locations on the body side panels 104. In this way, most, if not all components are fixed at one time so that tolerance stack-up is reduced. Locational placement of the door hinges 124, the brackets 126, and the striker plates 128 are shown in FIG. 7.

Figures 8, 8A:
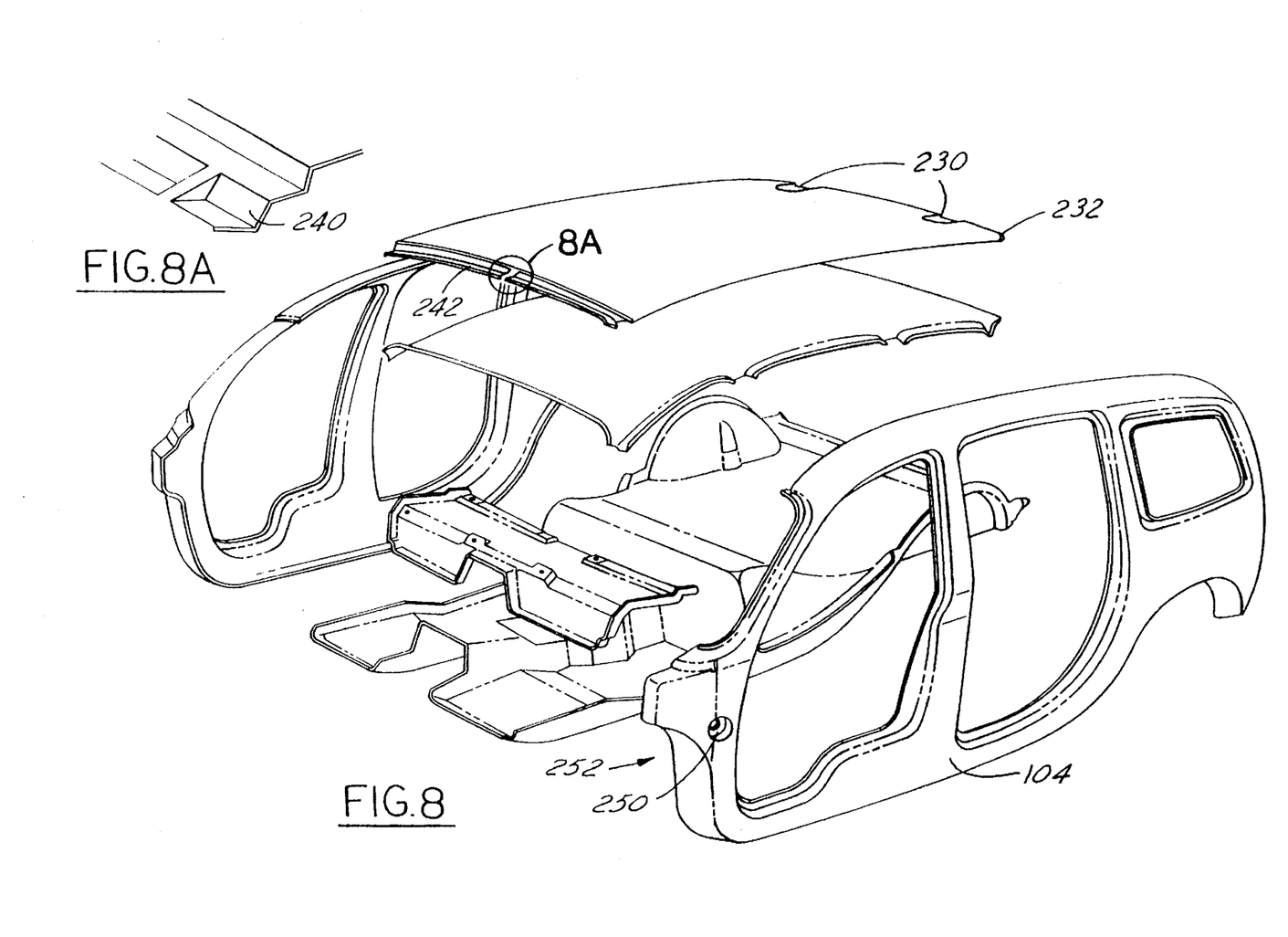
FIG. 8 is an exploded perspective view of body panels used to construct a vehicle compartment showing alignment devices on the panels used for aligning the panels on a single station assembly apparatus.
FIG. 8A is a perspective view of a roof outer panel alignment groove.

The aforementioned panels have alignment features, as shown in FIG. 8, which assist in properly aligning the panels on the assembly station 10. The roof outer panel 130 has a pair of liftgate bracket notches 230 along a rear edge 232 which are used for horizontal alignment, that is, fore-aft and lateral alignment. The notches 230 fit into mating knobs (not shown) on the rear tray 32. A groove along a front edge 242 of the roof outer panel 130 has a wedge 244 (FIG. 8A) which is biased against an external stop 246 by an external force, such as a spring loaded alignment tool, for proper lateral alignment of the front of the roof outer panel 130. Alignment of the body side panels 104 on the side supports 42 is accomplished by a recess 250 at a forward portion 252 of the side panel 104 which receives a knob 254 (FIG. 1) on an inner surface of the side supports 42.

Figures 9, 10, 11:
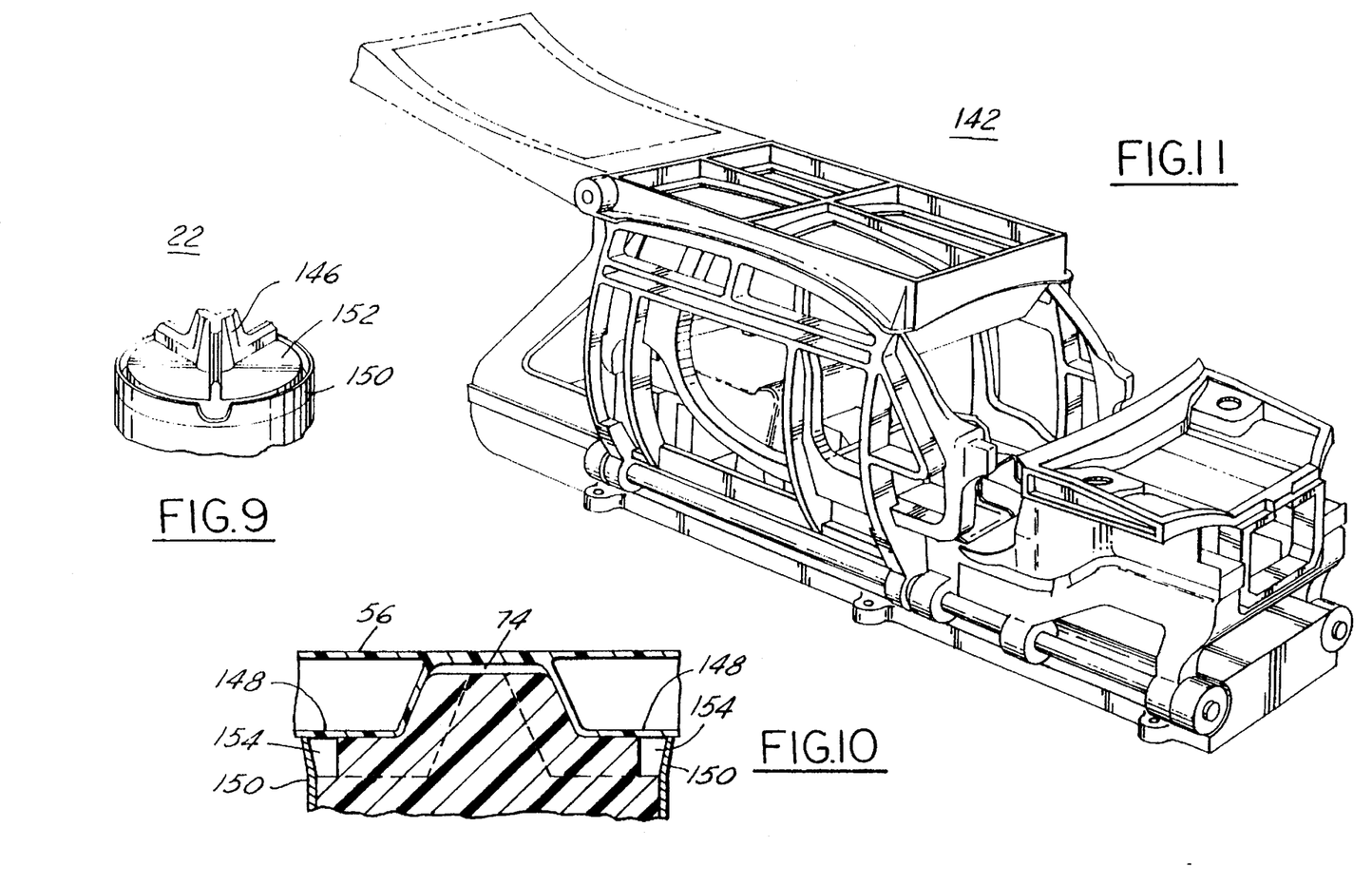
FIG. 9 is a perspective view of an alignment cup on the assembly station apparatus.
FIG. 10 is a side cross-sectional view era portion of a underbody mountably aligned on the alignment cup of FIG. 16.
FIG. 11 is a perspective view, similar to FIGS. 1 and 5, showing assembly of the multi-panel compartment.
Figure 12:
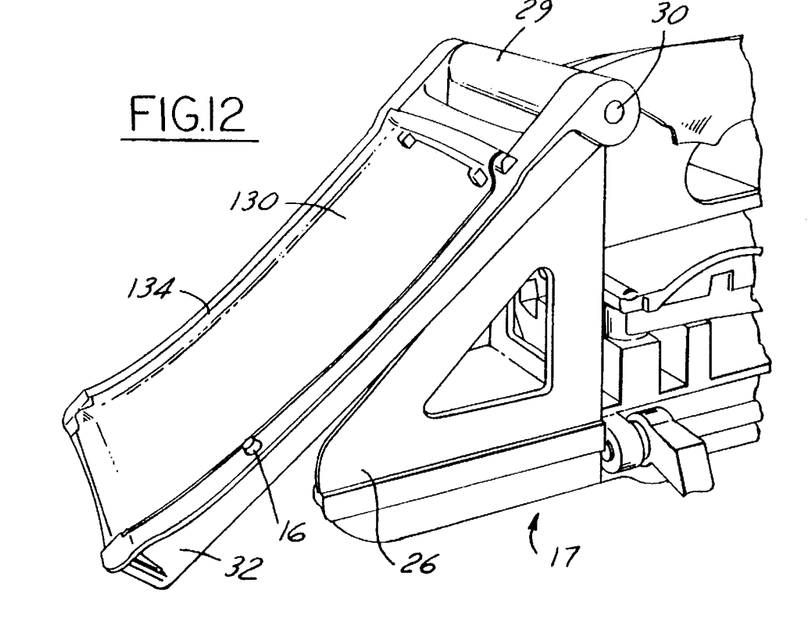
FIG. 12 is a partial perspective view of the rear tray of the assembly station apparatus.

Turning now to FIG. 9, an alignment and retention cup 22 having a three-pronged member 146 thereon provides positive alignment for placement of the underbody 56 on the base 12. The three-pronged member 146 fits within a recess 74 in the bottom surface 148 of the underbody 56 (FIGS. 3B and 10). An annular seal 150 surrounds a cylinder portion 152 of the alignment cup 22 to provide a vacuum retention force to maintain the underbody 56 in a fixed position relative to the base 12. As the underbody 56 is lowered onto the base 12 and aligned with the alignment and retention cup 22, the bottom surface 148 of the underbody 56 deflects the annular seal slightly, and a vacuum is created in a chamber 152 between the underbody bottom surface 148 and the alignment and retention cup 22 (FIG. 10). The alignment and retention cups 23, 36 preferably do not have the three-pronged alignment member 146, but primarily position the underbody 56 in a vertical direction only.

Figure 13:
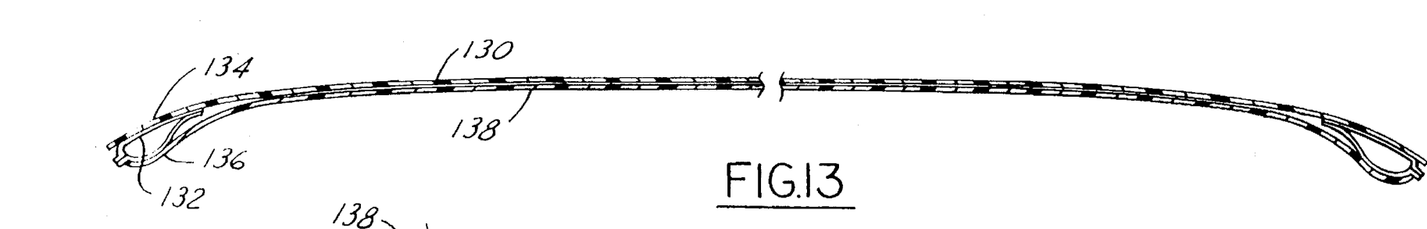
FIG. 13 is a cross-sectional view of an assembled roof panel.
Figure 14:
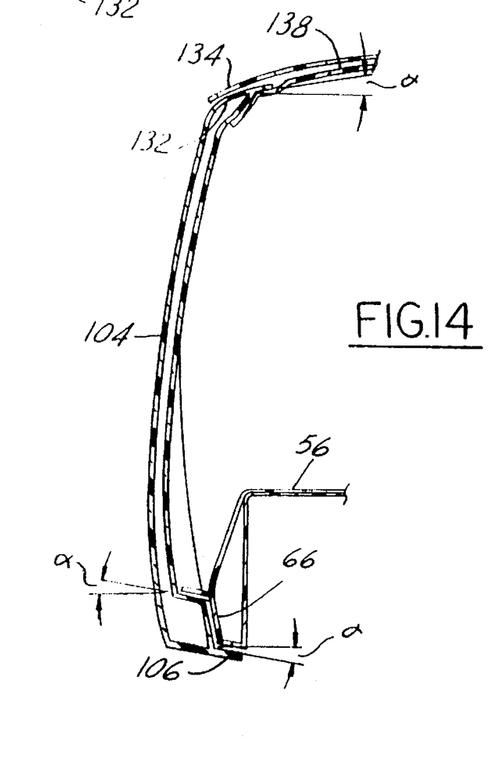
FIG. 14 is a cross-sectional view of a side panel shown connected with the roof panels and with the underbody.
Figure 15:
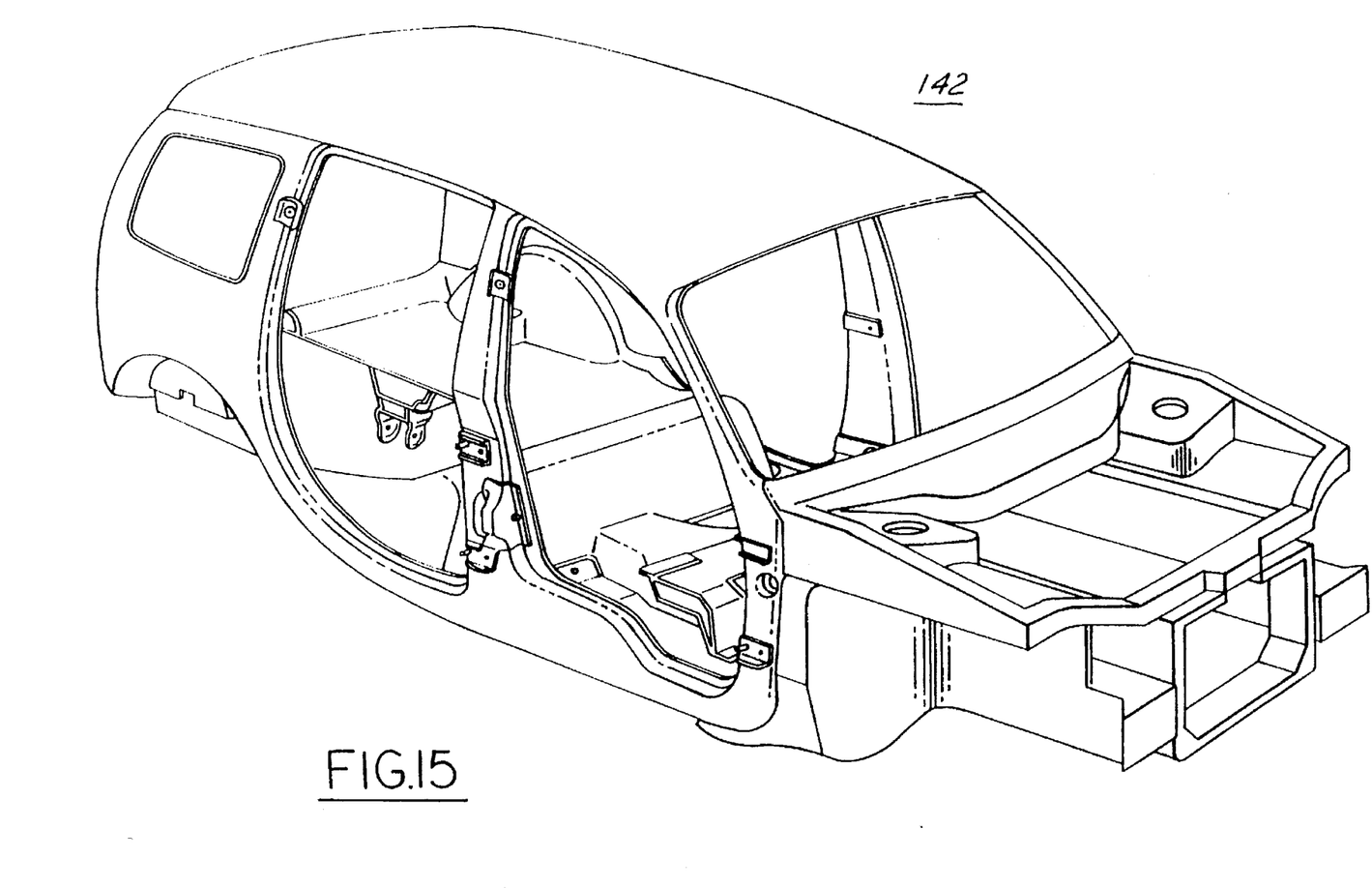
FIG. 15 is a perspective view of an assembled multi-panel compartment according to the present invention.

As seen in FIG. 11, the side supports 42 are rotated around the longitudinal axis of the reference rails 16 so that the body side panels 104 mate with the underbody 56. The rear tray 32 is rotated about axle 30 to place the roof outer panel 130 in mating contact with a rail outer surface 132 of the body side panels 104 (FIGS. 5, and 11–13). As seen in FIG. 13, edge portions of the roof outer panel 130 fit over the body side flanges 13. Lateral portions 136 of the roof inner panel 138 likewise fit underneath and mate with the body side flanges. Along the lower edge of the body side panel 104, as better seen in FIG. 14, the flange 106 is angled from the base 12, which substantially corresponds to a horizontal plane 140, at an angle α between approximately 5° and 15°, and preferably approximately 10°. The angle of the flange 106 from the horizontal is important since the adhesive 94 applied thereto may flow or drip therefrom, or run off the flange 106, during the cure time after the body side panel 42 have been rotated into position as described above. An assembled vehicle compartment 142 is shown in FIG. 15. The assembled position is that position when a component, or member, is adhesively mated to at least one other component or member of the multi-panel compartment.

Preferably, all mating flanges for adjacent panels of the present invention, including flanges 106, 134, and 136, are angled at approximately between 5° and 15°, and preferably approximately at 10°, from a line perpendicular to the mating surfaces (FIG. 14) to prevent adhesive wipe-off. Flanges angled at less than approximately 5° from a line perpendicular to the surface result in the adhesive wipe-off problem. Flanges angled at more than approximately 15° from a line perpendicular to the surface result in unpredictable adhesive distribution, and may not provide sufficient retention between adjacent surfaces.

Figure 16A:
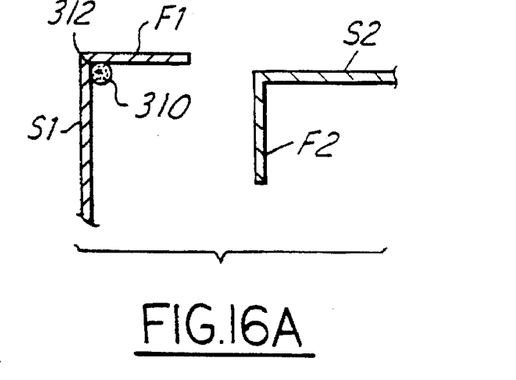
FIGS. 16A and 16B show a schematic diagram of a prior construction having mating of flanges on adjacent surfaces which result in adhesive wipe-off.
Figure 16B:
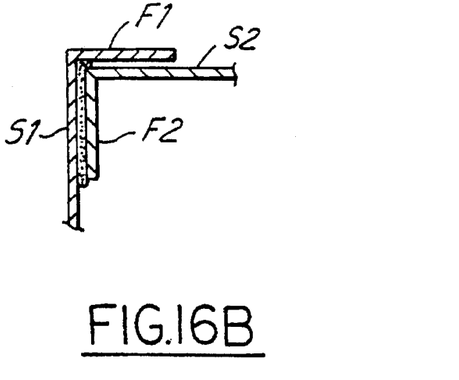
Figure 17A:
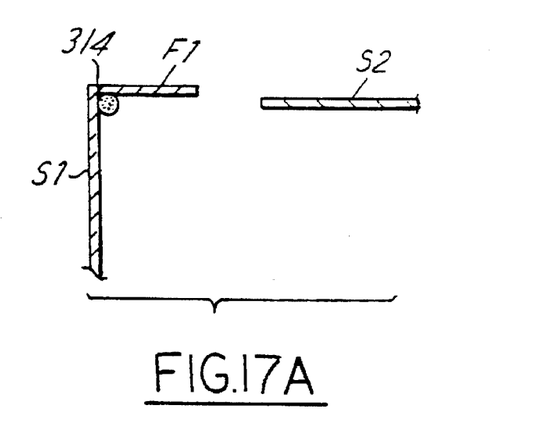
FIGS. 17A and 17B show another schematic diagram of a prior construction having a mating flange which results in adhesive wipe-off.
Figure 17B:
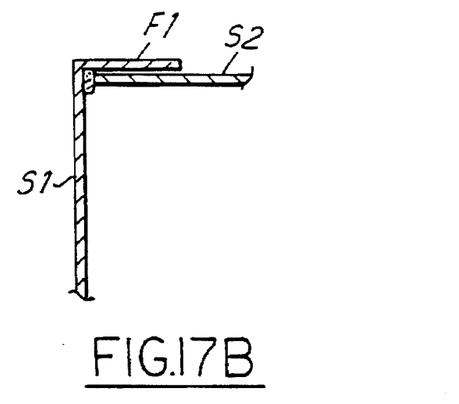

The adhesive wipe-off problem is demonstrated in FIGS. 16A–B and 17A–B in the prior panel mating method depicted in FIG. 16A, adjacent mating surfaces S1 and S2 have flanges F1 and F2, respectively, angled at 90° from the surfaces S1 and S2. A bead 310 of adhesive is placed in the bend 312 of the surface S1 and movement of the surface S2 into engagement with the surface S1 results in an uneven distribution of adhesive on opposite sides of the bend 312. For example, the flange F1 and the surface S2 may be left with no adhesive thereon (FIG. 16B). Likewise, in FIGS. 17A–B, movement of the surface S2 into the bend 314 of surface S1 may result in the flange F1 having little or no adhesive thereon. Such a bond will not adequately hold the surfaces S1 and S2 together.

Figure 18A:
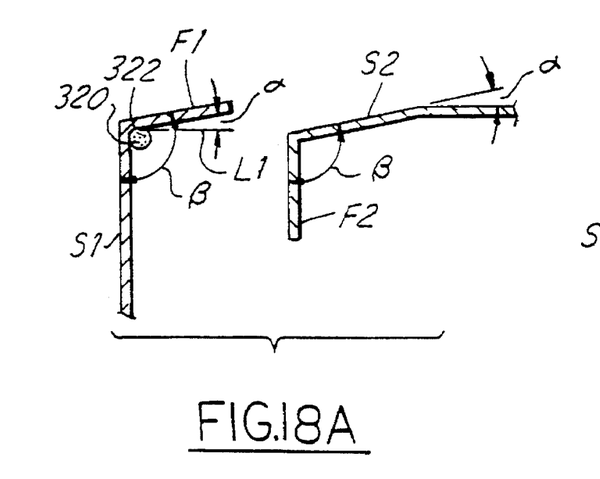
FIGS. 18A and 18B show a schematic diagram of mating flanges on adjacent surfaces according to the present invention which reduces adhesive wipe-off.
Figure 18B:
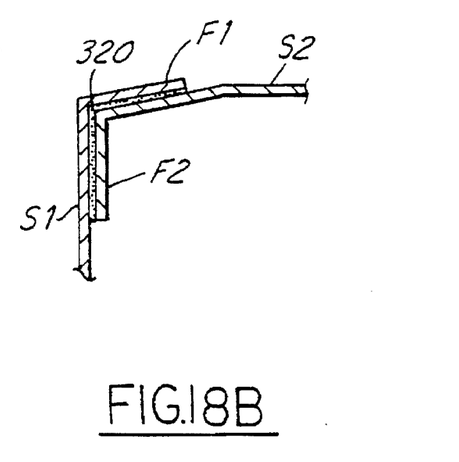

In contrast, mating panels of the present invention have wipe resistant surfaces, or flanges, angled between approximately 5° and 15°, and preferably angled approximately 10°. Referring to FIG. 18A, a surface S1 has a flange F1 extending at an angle α, approximately 10°, from a line L1 perpendicular to the surface thereof, and a mating surface S2 has a flange F2 likewise bent at an angle α, also approximately 10°, from the surface thereof. A bead 320 of adhesive is placed in the bend 322 of surface S1 so that movement of surface S2 into a mating position with surface S1 will result in an even distribution of adhesive on either side of the bend 320 (FIG. 18B). Preferably, the panels are angled so that the included angle β is greater than 90°.

Construction of the multi-panel compartment is accomplished as follows. The underbody 56 is placed on base 12 of the assembly station 10 (FIG. 11), either manually, robotically, or a combination of both. As discussed above, the underbody 56 is aligned on base 12 with the alignment and retention cups 22, 23, 36, and the lever 41 and tab 43. The alignment and retention cup 22 aligns the underbody 56 vertically, transversely, and longitudinally, that is, in three dimensions. The alignment and retention cups 23 align the underbody 56 in a vertical direction only. The lever 41 is then moved toward the tab 43 to transversely position the rear end of the underbody 56. Suspension 39 and other components, such as tension strut brackets (not shown), are placed on base 12 before the underbody 56 is loaded thereon.

The roof inner panel 138 is then loaded onto the stationary support 28 situated above base 12 (FIG. 11), and the roof outer panel 130 is loaded onto the rear tray 32 (FIG. 15). Body hardware, such as that described above, is attached as described above. Body side panels 104 are then loaded on each of the rotatable side supports 42 on opposite sides of the base 12. The front end member 50 is then placed on the front tray 14, which is longitudinally slidable with respect to base 12. It is not necessary that the underbody 56, the roof inner panel 138, the roof outer panel 130, the body side panel 104, or the front end member 50 be loaded or placed onto the assembly station in the order just described. That is, the panels of the multi-panel compartment can be loaded simultaneously or in any convenient order. Assembly of the multi-panel compartment is not contingent upon the order of placement of the separate panels onto the assembly station 10. The cross-support member 90 is placed on an upper surface of the underbody 56 with the arch 92 positioned over the transmission and driveshaft duct 62 (FIGS. 8 and 11), with adhesive 94 appropriately placed as described above.

Adhesive 94 is applied to mating surfaces of the underbody 56, the body side panels 104 (FIG. 12), the roof outer panel 130, and the front end member, as previously described. Preferably, a durable, non-brittle, urethane adhesive is used which may be robotically applied to the mating surfaces.

The side supports 42 are then rotated to an assembling position (FIGS. 5 and 11) so that mating flanges 106, 132 on the side panels 104 adhesively abut the underbody 56 and the roof inner panel 138. The rear tray 32 is next rotated about the axle 30 to a closed position (FIG. 11) so that the roof outer panel 130 achieves an adhesively abutting relationship with the roof inner panel 138 and the side body panels 104 (FIGS. 13 and 14). The front tray 14 is slid toward the base 12 so that the front end member 50 adhesively abuts the underbody 56 and the side body panels 104. Curing of the adhesive 94 is preferably facilitated by application of heat to the exposed surfaces thereof to hasten the process. The intensity and duration of heat applied will vary with the type of adhesive, thickness of the layer of adhesive applied, and surface of adhesive exposed to the heat, as well as other factors known to those skilled in the art and suggested by this disclosure.

The assembled vehicle compartment is removed from the assembly station 10 by rotating the rear tray 32 to the open position, rotating the body side supports 42 to the loading positions, sliding the front tray 14 away from the vehicle body 142, and lifting up and moving forward the vehicle body. An assembled vehicle body is shown in FIG. 15.

Figure 19:
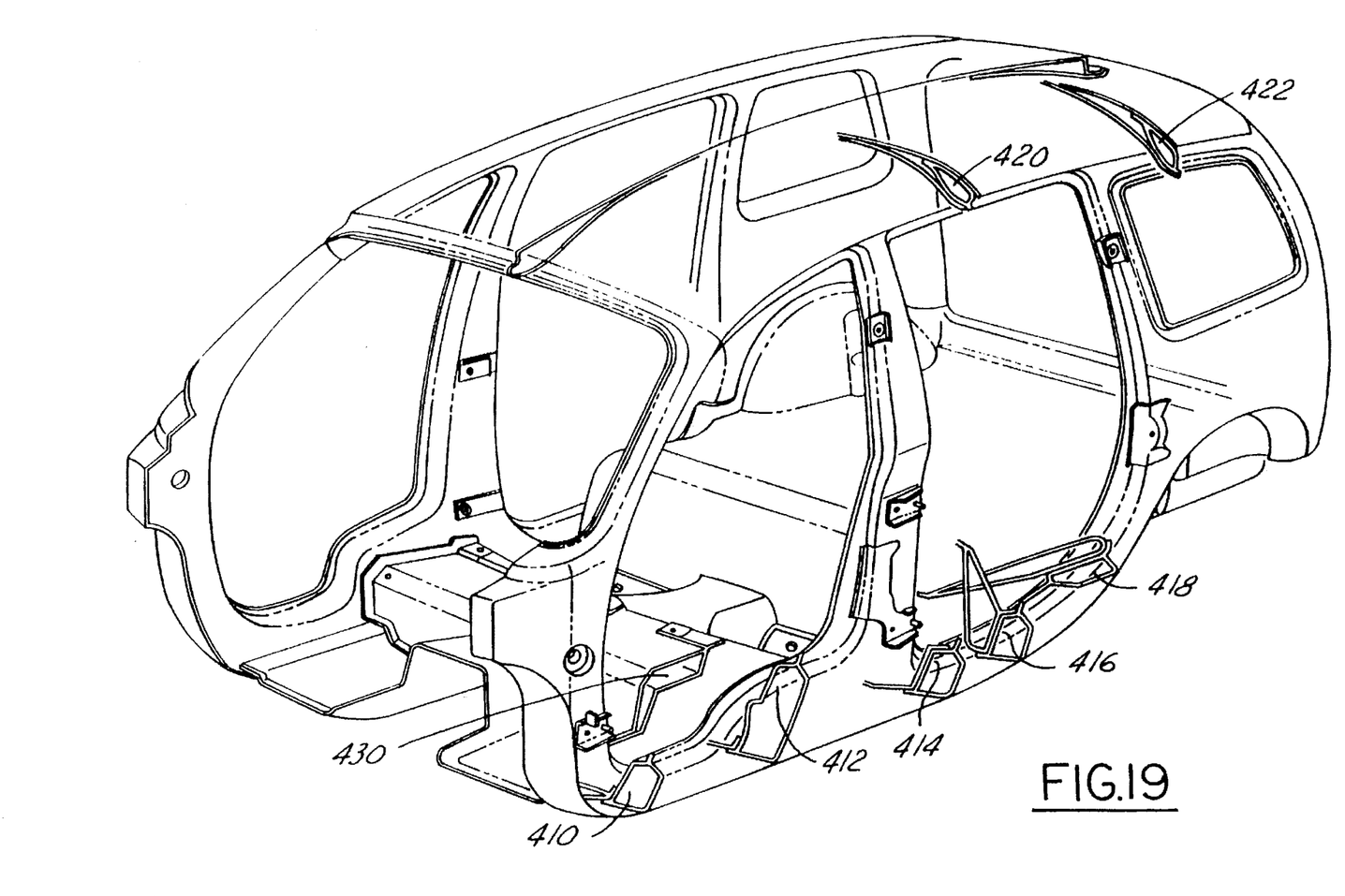
FIG. 19 is a perspective view of a body compartment, without the front end member, assembled on a single station assembly apparatus showing cut-away views of body panel flange joints arranged to reduce adhesive wipe-off.

As seen in FIGS. 10 and 11, the roof inner panel 138 and the roof outer panel 130, which combine to form a roof panel unit, have mating flanges 136, 134, respectively, on edges thereof, which mate on an upper surface and a lower surface, respectively, to the upper side panel mating flange 132. FIG. 19 shows joints 410, 412, 414, and 418 of the body side panel 104 and floor member 56 on an assembled vehicle body having the advantageous flange mating construction as described above. Also shown in FIG. 19 are roof panel/side body penal joints 420 and 422, as well as a joint 430 between the cross-member 90 and the floor member 56.

Although the preferred embodiment of the present invention has been disclosed, various changes and modifications may be made without departing from the scope of the invention as set forth in the appended claims.

I claim:

1. An assembly apparatus for constructing a multi-panel vehicle compartment by mounting body panels with respect to a single base for movement into an assembled position, the apparatus comprising:

a base for receiving an underbody member thereon;

roof support means in generally planar alignment with said base for receiving a roof inner panel on an upper surface thereof;

roof holder means axially mounted with respect to said roof support means for receiving a roof outer panel thereon and for rotating said roof outer panel onto said roof inner panel;

side support means rotatably mounted on opposing side edges of said base for swingably positioning a pair of body side panels in juxtaposition with said underbody member, said roof outer panel, and said roof inner panel; and a slidable tray for holding a body front end portion to slidingly engage said body front end portion with said underbody member and said pair of body side panels.

2. An assembly apparatus according to claim 1 wherein said roof support means comprises a generally planar roof support member mounted on a pedestal at a rear end of said base.

3. An assembly apparatus according to claim 2 wherein said roof holder means comprises a rotatable roof holder axially mounted on an upper edge of the pedestal for receiving a roof outer panel thereon and for rotating the roof outer panel onto the roof inner panel.

4. An assembly apparatus according to claim 1 wherein said side support means comprises a pair of side supports rotatably mounted on opposing side edges of the base for swingably positioning a pair of body side panels in juxtaposition with the underbody, the roof outer panel, and the roof inner panel.

5. A vehicle body assembly apparatus for constructing a vehicle body at a single assembly site by moving vehicle body panels into an assembled position adhesively fixed together in spaced relationship without direct contact therebetween, the apparatus comprising:

a base for receiving an underbody thereon, the base having a forward end and a rear end;

a pedestal proximate the rear end of the base;

a roof support member cantileverly mounted from a forward wall of the pedestal in generally planar alignment with the base for receiving a roof inner panel on an upper surface thereof;

a rotatable roof holder axially mounted on an upper edge of the pedestal for receiving a roof outer panel thereon and for rotating the roof outer panel onto the roof inner panel;

a pair of side supports rotatably mounted on opposing side edges of the base for swingably positioning a pair of body side panels in juxtaposition with the underbody, the roof outer panel, and the roof inner panel; and a slidable tray at the forward end of the base for holding a body front end portion to slidingly engage the body front end portion with the underbody and the pair of body side panels.

6. An assembly apparatus according to claim 5 wherein the base has a pair of referencing rails mounted on opposite side edges thereof onto which the pair of side supports and the slidable tray are mounted for providing an assembly reference for the body side panels and the front end portion.

7. An assembly apparatus according to claim 5 wherein the base has underbody alignment means on a top surface thereof for aligning the underbody in a predetermined relationship with the base.

8. An assembly apparatus according to claim 7 wherein the underbody alignment means comprises at least one pair of alignment cups on opposite sides of the forward end of the base.

9. An assembly apparatus according to claim 7 wherein the underbody alignment means comprises a pair of alignment cups on opposite sides of the forward end of the base and a pair of alignment cups on opposite sides of the rear end of the base.

10. An assembly apparatus according to claim 9 wherein each of the alignment cups comprises a raised cylindrical portion and at least three circumferentially spaced alignment prongs on a top surface of the cylindrical portion.

11. An assembly apparatus according to claim 10 wherein the base has retention means thereon for retaining the underbody in a predetermined relationship therewith.

12. An assembly apparatus according to claim 11 wherein the retention means comprises a seal member substantially surrounding the at least three alignment prongs in the alignment cups.

13. An assembly apparatus for assembling multiple panels at a single assembly site into an adhesively fixed, spaced relationship without direct contact therebetween by mounting the panels with respect to a single base for movement into an assembled position, the apparatus comprising:

a base for receiving an underbody thereon, the base having a forward end, a rear end, and underbody alignment and retention means;

a pedestal proximate the rear end of the base;

a roof support member cantileverly mounted from a forward wall of the pedestal in generally planar alignment with the base for receiving a roof inner panel on an upper surface thereof;

a rotatable roof holder axially mounted on an upper edge of the pedestal for receiving a roof outer panel thereon and for rotating the roof outer panel onto the roof inner panel;

a pair of side supports rotatably mounted on a pair of referencing rails on opposing side edges of the base for swingably positioning a pair of body side panels in juxtaposition with the underbody, the roof outer panel, and the roof inner panel; and a slidable tray mounted on the pair of referencing rails at the forward end of the base for holding a body front end portion to slidingly engage the body front end portion with the underbody and the pair of body side panels.

14. An assembly apparatus according to claim 13 wherein the roof support, the side supports, and the roof holder have alignment means thereon for providing a predetermined spaced relationship therebetween.

15. An assembly apparatus according to claim 14 wherein the alignment means comprises at least one recess and knob combination on a peripheral portion of each of the side supports, the roof support, and the roof holder, with a knob of the combination on one of the side supports, the roof support, and the roof holder, and the recess of the recess and knob combination on an adjacent peripheral portion of another of the side supports, the roof support, and the roof holder.

16. An assembly apparatus according to claim 15 wherein the underbody alignment and retention means comprises a pair of alignment and retention cups on opposite sides of the forward end of the base and a pair of alignment and retention cups on opposite sides of the rear end of the base.

17. An assembly apparatus according to claim 16 wherein each of the alignment and retention cups comprises a raised cylindrical portion, at least three circumferentially spaced alignment prongs on the cylindrical portion, and a seal member substantially surrounding the at least three alignment prongs.

* * * * *